United States Patent
Kratschmann et al.

(10) Patent No.: US 6,690,791 B1
(45) Date of Patent: Feb. 10, 2004

(54) METHOD AND ARRAY FOR ECHO COMPENSATION IN PARTIAL BANDS

(75) Inventors: Horst-Jürgen Kratschmann, Korneuburg (AU); Konrad Bertignoll, Vienna (AU)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/674,951

(22) PCT Filed: May 3, 1999

(86) PCT No.: PCT/DE99/01320

§ 371 (c)(1),
(2), (4) Date: Nov. 8, 2000

(87) PCT Pub. No.: WO99/59260

PCT Pub. Date: Nov. 18, 1999

(30) Foreign Application Priority Data

May 8, 1998  (DE) .......................................... 198 20 690

(51) Int. Cl.[7] .............................................. H04M 9/08
(52) U.S. Cl. ............................ 379/406.14; 379/406.01; 370/286; 370/289
(58) Field of Search ....................... 379/406.01, 406.03, 379/406.08, 406.09, 406.14; 370/286, 289

(56) References Cited

U.S. PATENT DOCUMENTS

| | | | |
|---|---|---|---|
| 5,598,468 A | * 1/1997 | Ammicht et al. | 379/406.08 |
| 5,631,957 A | 5/1997 | Greiss et al. | 379/406 |
| 5,721,772 A | * 2/1998 | Haneda et al. | 379/406.14 |
| 5,970,154 A | * 10/1999 | Chen et al. | 381/66 |

FOREIGN PATENT DOCUMENTS

| | | | |
|---|---|---|---|
| DE | 3431 141 A1 | 3/1986 | H04B/3/20 |
| DE | 689 12 372 T2 | 7/1994 | H04B/3/23 |
| EP | 0 615 350 A1 | 9/1994 | H04B/3/20 |

OTHER PUBLICATIONS

Murano et al., "Echo Cancellation and Applications", IEEE Communications Magazine, Jan. 1990, No. 1, pp. 49–55.

Theory and Design of Adaptive Filters: "Digital Voice Echo Canceller with a TMS32020", by Texas Instruments and Teknekron Communications Systems, pp. 302–323.

* cited by examiner

Primary Examiner—Binh Tieu
(74) Attorney, Agent, or Firm—Shaw Pittman LLP

(57) ABSTRACT

Echo compensator with a plurality of sub-bands, whereby a complete FIR filter (FIR1) is employed in only one sub-band and shortened FIR filters (FIR2) that are respectively connected in series with an adjustable delay element (Z) are provided in the other sub-bands.

9 Claims, 3 Drawing Sheets

METHOD AND ARRAY FOR ECHO COMPENSATION IN PARTIAL BANDS

BACKGROUND OF THE INVENTION

1. Field of the Invention

The present invention is directed to a method for echo compensation and to an arrangement for the implementation of this method.

2. Description of the Related Art

Due to the finite attenuation of hybrid circuits, an echo signal that stems from a remote subscriber station is superimposed on the transmission signal of a first subscriber station. A correction signal for the compensation of the echo signal is determined from the received signal in an echo compensator with the assistance of an FIR filter (with finite pulse response) that is sometimes supplemented by a recursive filter. It is standard to process digitalized signals in the echo compensators. The realization can ensue both as a traditional hardware circuit with memories, multipliers and adders or, on the other hand, as a software solution with signal processors.

For reducing the circuit or, respectively, calculating outlay, it is known to divide the signals to be processed into sub-bands.

German letters Patent DE 689 12 372 T2 discloses a means for echo compensation with filtering in frequency sub-bands that is utilized for filtering interference caused by acoustic couplings. A plurality of parallel processing channels that respectively comprise two analysis filters and a symmretrical synthesis filter are provided for echo suppression.

Published European Patent Application EP 0 615 350 A1 discloses a method for the compensation of acoustic noise signals wherein the signal to be compensated is divided into a plurality of sub-bands that are likewise individually compensated. The plurality of filter coefficients of the adaptive filters is controlled for further reduction of the convergence time.

SUMMARY OF THE INVENTION

An object of the present invention is to reduce the outlay even farther.

This object is achieved by the method for echo compensation wherein the signal to be compensated and a received signal serving for the determination of correction signals are respectively divided into a plurality of mutually corresponding sub-bands, and a compensated signal is acquired in each sub-band by setting the filter coefficients of compensator filters, a compensation signal in at least one sub-band is acquired in a filter arrangement composed of a series circuit of an adjustable delay element and a compensator filter shortened by roughly the running time thereof, being acquired by setting the delay time of the delay element and the filter coefficients of the compensator filter.

It is thereby advantageous that a full-length filter is only required for one sub-band. A series circuit of a variable delay element and a shortened filter is respectively employed for the other sub-bands. As a result thereof, fewer multipliers or, respectively, fewer calculating steps are required, since the calculating performance is proportional to the plurality of filter coefficients.

Given more than two sub-bands, the delay elements of the remaining filters can be set to the same delay time, except for the first sub-band for which a full-length filter is required.

The calculating outlay or, respectively, circuit outlay drops approximately inversely with the number of sub-bands since fewer coefficients need be calculated in the individual filters and lower processing frequencies can be employed.

The echo compensator is also especially suited for multi-tone reception devices; fundamentally, however, it is not limited thereto. The sub-bands can be re-combined into one band with a synthesis filter bank.

BRIEF DESCRIPTION OF THE DRAWING

Exemplary embodiments of the echo compensator are described if greater detail with reference to Figures.

DETAILED DESCRIPTION OF THE PREFERRED EMBODIMENTS

Figure 1:
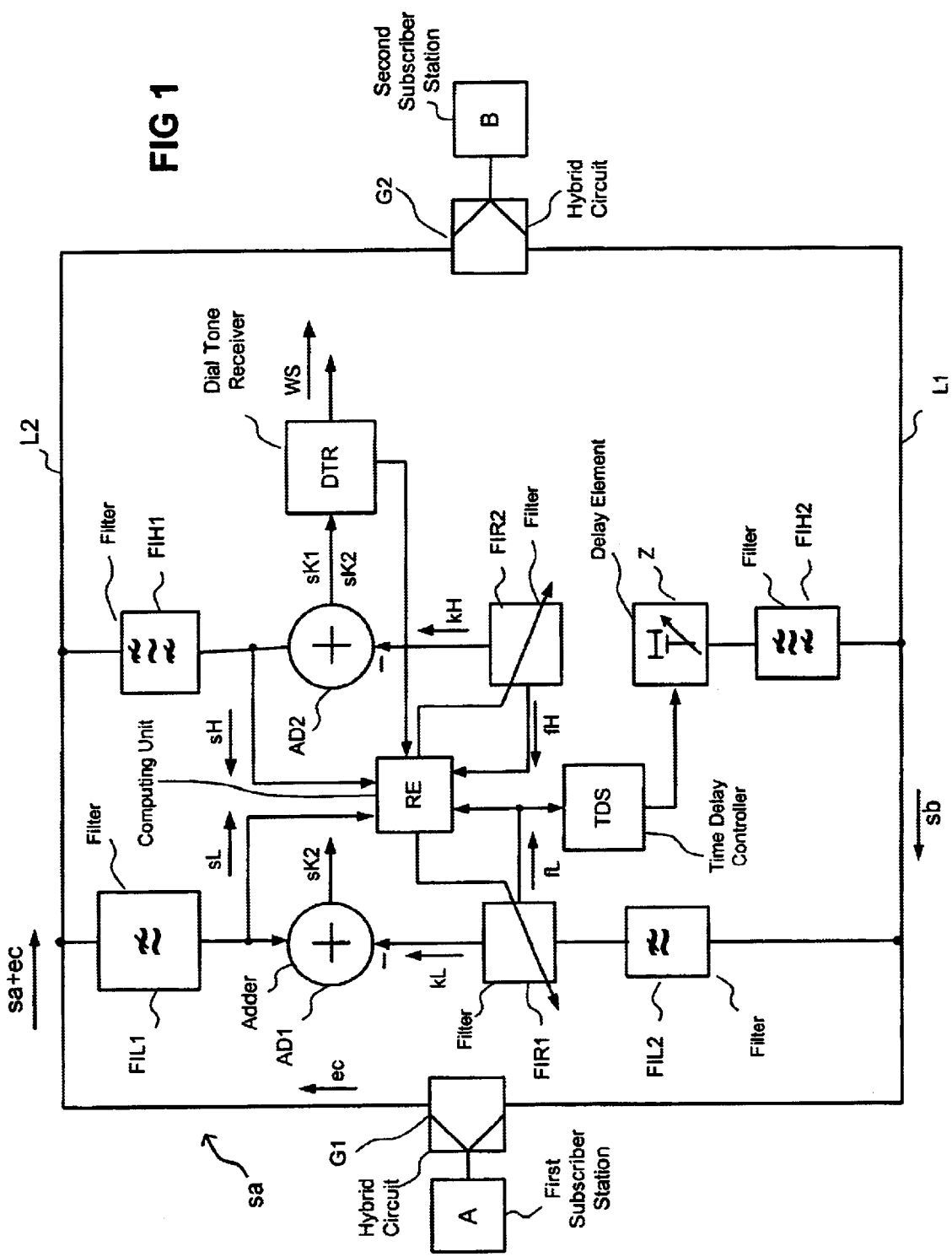
FIG. 1 is a block circuit diagram of an echo compensator for a two-tone receiver.

FIG. 1 shows the schematic circuit diagram of a sub-band echo compensator. The illustration of notoriously known function units, for example for linearization and for relativizing the signal values, for speech recognition as well as for calculating the filter coefficients, for example according to the standard LMS algorithm (least mean square), etc., has been foregone; they are already at the command of anyone skilled in the art. Given a realization with program-controlled digital signal processors, the filters, delay elements, calculating circuits, etc., are to be functionally understood.

Via lines L1 and L2, a first subscriber station A is connected to a second subscriber station B. The subscribers are connected via hybrid circuits G1 and G2. Due to the inadequate attenuation of the hybrid circuit G1, a part of the signal sb received from the first subscriber station A is superimposed on its own transmission signal sa as echo signal ec. From this signal, a dual-tone receiver DTR is supposed to decode the received combination from a plurality of possible frequency combinations and, for example, convert it into dial signals WS.

A division of the signal sa+ec into two sub-bands, which can respectively contain a plurality of different dial tones, ensues with filters FIL1 (L—low for low frequency) and FIH1 (H—high for high frequency). For echo compensation, the corresponding sub-bands are formed from the signal sb by filters FIL2 and FIH2, and compensation signals kL and kH are generated with the assistance of FIR filters, the compensator filter FIR1 or, respectively, the delay element Z and the compensation filter FIR2. To this end, signal values sL and sH output at outputs of the filters FIL1 and FIH1 are supplied to a computing unit RE that implements correlations with a respective plurality of differently delayed signal values fL or, respectively, fH of the filters FIR1 and FIR2 for determining the filter coefficients. For example, the calculation ensues according to the method of the smallest square error (LMs algorithm). In adders AD1 or, respectively, AD2 (or, respectively, subtractors), the compensation signals kl and kH are added or, respectively, subtracted for minimizing for minimizing the parts stemming from the echo signal ec. The compensated sub-band signals sK1 and sK2 are suppled to the dual-tone receiver.

The invention is based on the following consideration. The transfer function of the hybrid circuit is composed of a dead time, which derives from the signal running time via the forward and return connection between the hybrid and the echo compensator, and from the transfer function. The dead time can be compensated by a variable delay element Z; it usually lies between a few and up to approximately 120 milliseconds. The compensation signal kH can then be generated by the shortened filter FIR2. The overall delay corresponds to the delay of the first FIR filter FIR1.

At the beginning of a compensation event, the filter coefficients of the complete FIR filter FIR1 are first determined. The settings of the timing element Z and of the shortened FIR filter FIR2 then follow (given a plurality of sub-bands of the timing elements and the FIT filters allocated thereto).

Fundamentally, the delay element can be set by the computing unit. Here, a separate means is provided for the control of the delay element Z, the time delay controller TDC, which determines the time delay from the coefficients of the first compensator filter FIR1, for example from the change of the coefficient size and the maximum coefficient, so that the computing unit need only calculate the filter coefficients of the second compensator filter FIR2.

Figure 2:
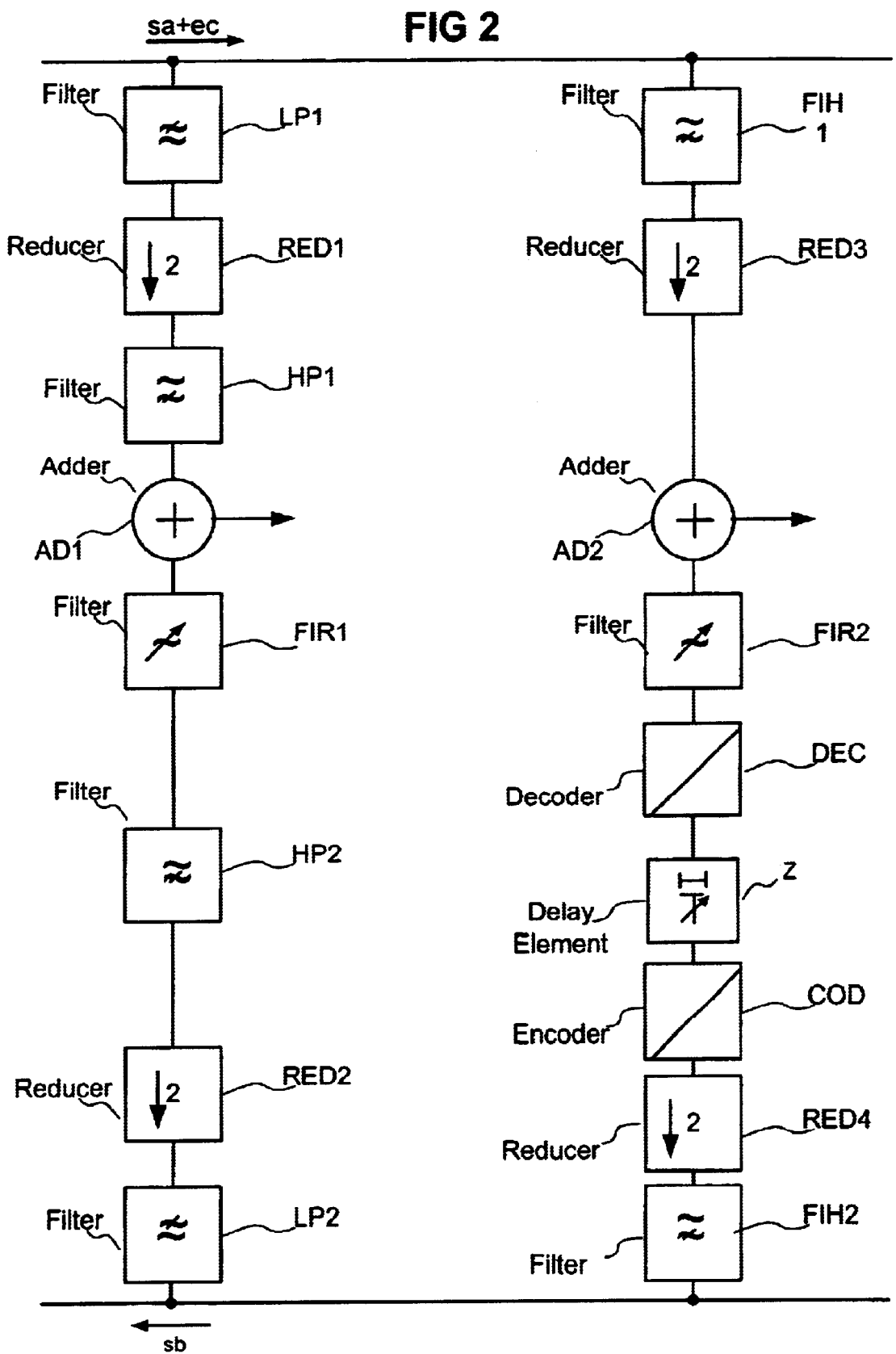
FIG. 2 is a block circuit diagram of an echo compensator for voice signals.

The compensation branches are shown in greater detail in FIG. 2. In the first compensation branch, the first filter FIL1 is replaced by a low-pass filter LP1 and a high-pass filter HP1 that keeps constant parts away. The blocking of the constant part is advantageous for the coefficient calculation with LMS algorithm. The lower part of the compensation branch is fashioned in the same way. Further, data rate reduction means RED1 and RED2, what are referred to as clock rate compressors or decimators, are provided in the upper and lower part of the compensation branches, these effecting a halving of the working clock here.

The second compensation branch likewise contains working clock reduction devices RED3 and RED4 in the upper and lower part. Due to the processing of only every other signal value, the number of calculating steps is halved in a processor realization. As a result of a suitable compression and encoding, a coder COD and a decoder DEC in the compensation branch of the further sub-band effect a further reduction of the memory requirements for the data to be delayed.

Figure 3:
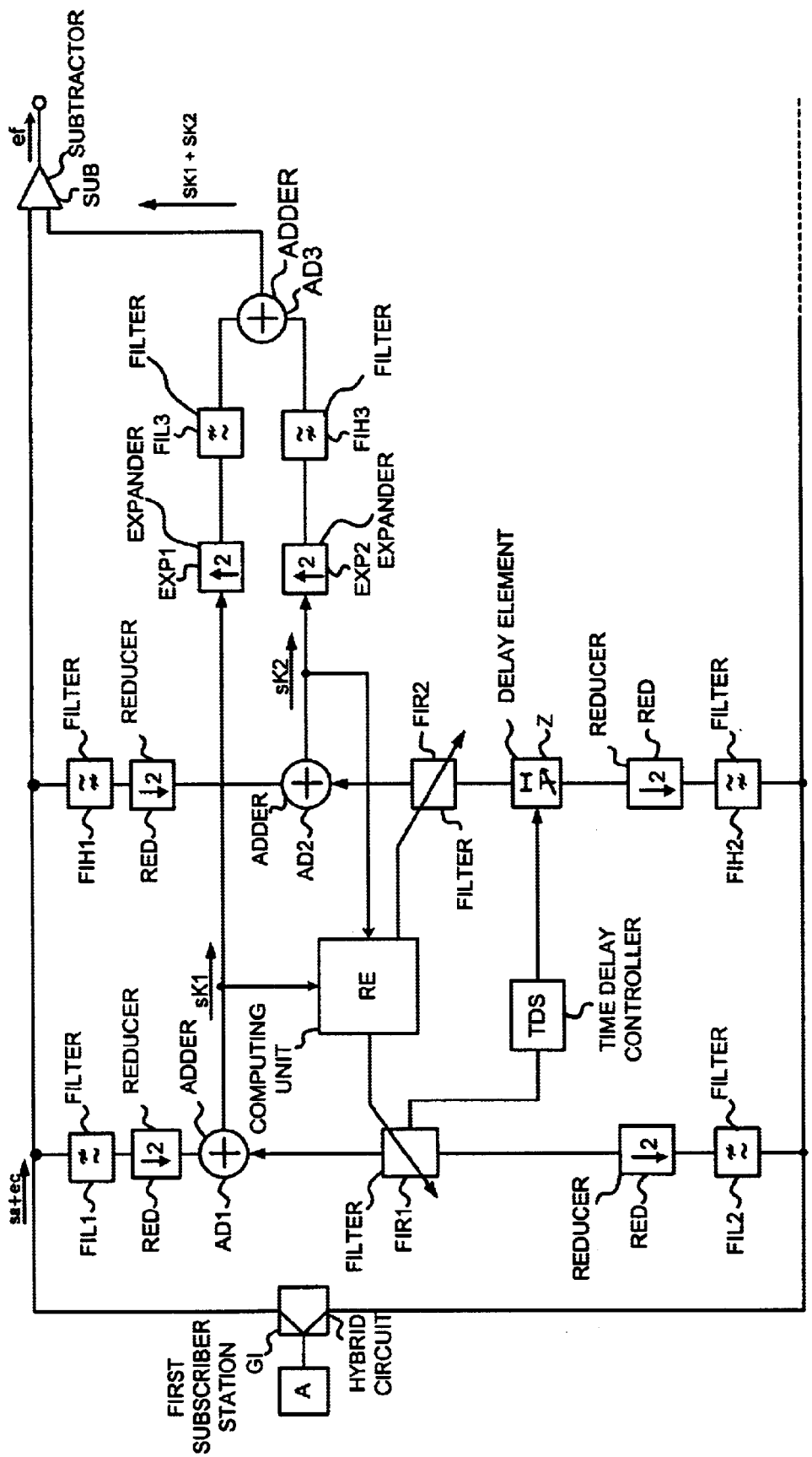
FIG. 3 is a block circuit diagram of an embodiment for voice signals

FIG. 3 shows an echo compensator for voice signals. Two sub-bands are again processed. The unshortened compensator filter FR1 lies in the sub-band whose typical signal energy is highest. Given a voice signal, this is the range up to 1 kHz. The delay element Z and the shortened filter FIR2 are allocated to the upper sub-band (a corresponding plurality of delay elements and shortened filters are allocated to more sub-bands). The illustration was simplified in that only the compensated signals are symbolically supplied to the computing unit. The functioning corresponds to the arrangement according to FIG. 1.

The compensated sub-band signals sK1 and sK2 are combined in a synthesis filter bank composed of filters FIL3 and FIH3 and a further adder AD3 and are subsequently subtracted—in a subtractor SUB—from the voice signal sa+ec of the subscriber station A superimposed with the echo signal EC, so that the echo signal ec is at least largely compensated—completely in the ideal case—and only a significantly smaller error signal ef remains. The data rate can be raised back to the original sampling rate with data rate expanders (multipliers) EXP1, EXP2.

Although other modifications and changes may be suggested by those skilled in the art, it is the intention of the inventors to embody within the patent warranted hereon all changes and modifications as reasonably and properly come within the scope of their contribution to the art.

We claim:

1. A method for echo compensation, comprising the steps of:

dividing a signal to be compensated and a received signal serving for determination of correction signals into a plurality of mutually corresponding sub-bands, acquiring a compensated signal in each sub-band by setting filter coefficients of compensator filters, and acquiring a compensation signal in at least one sub-band in a filter arrangement composed of a series circuit of an adjustable delay element and a compensator filter shortened by roughly a running time thereof, being acquired by setting a delay time of the adjustable delay element and the filter coefficients of the compensator filter.

2. A method according to claim 1, further comprising the step of:

controlling setting of the delay time of the adjustable delay element such by coefficients of the first filter that it corresponds to a dead time of echo signal.

3. A method according to claim 1, further comprising the step of:

lowering a working clock rate for calculation of the compensation signals compared to a rate of samples of the received signal.

4. A method according to claim 1, wherein the signal to be compensated and the received signal are divided into a plurality of sub-bands; and further comprising the step of:

individually compensating the sub-bands; and supplying the compensated sub-band signals to a multi-tone receiver.

5. A method according to claim 1, further comprising the steps of:

encoding samples of a further sub-band before the samples are intermediately stored for being delayed; and converting the samples back before the samples are supplied to the shortened filter.

6. An arrangement for echo compensation, comprising:

filters for dividing a signal to be compensated into a plurality of sub-bands, further filters for dividing a received signal into respectively corresponding sub-bands, and a computing unit for acquiring compensation signals by adapting filter coefficients of compensator filters, at least one of the compensator filters includes a filter arrangement with a series circuit of an adjustable delay element and a compensator filter shortened by roughly the running time thereof.

7. An arrangement according to claim 6, further comprising:

a delay control that derives a criterion for control of said adjustable delay element from the coefficients of the compensator filter.

8. An arrangement according to claim 6, wherein said filters include more than two filters for dividing the received signal and the signal to be compensated into more than two sub-bands.

9. An arrangement according to claim 6, wherein the filters are a program-controlled computer circuit.

* * * * *